United States Patent [19]

Scott, II

[11] Patent Number: 4,481,504

[45] Date of Patent: Nov. 6, 1984

[54] SOUND LEVEL ALARM WHICH IGNORES TRANSIENT SOUNDS

[76] Inventor: Wallace A. Scott, II, 3633 Redbud, Odessa, Tex.

[21] Appl. No.: 321,600

[22] Filed: Nov. 16, 1981

[51] Int. Cl.³ ............................................. G08B 21/00
[52] U.S. Cl. ................................... 340/573; 307/117; 340/529; 340/540; 340/566; 381/56
[58] Field of Search .............. 340/566, 540, 573, 529; 181/0.5; 381/56; 307/117; 73/646, 647, 658

[56] References Cited

U.S. PATENT DOCUMENTS 4,346,374  8/1982  Groff .................................. 340/540

Primary Examiner—Glen R. Swann, III

Attorney, Agent, or Firm—Marcus L. Bates

[57] ABSTRACT

A sound level alarm device sequentially listens to the sound level of an enclosure or area for a first predetermined interval of time, and thereafter does not listen to the sound level of the area for another predetermined interval of time. The circuit sounds an alarm upon detection of a sound level of a predetermined magnitude measured during the first time interval. The circuitry is designed for omitting quick, sharp noises such as a cough, hand clap, book dropping, or the like. The apparatus is advantageously used in class rooms, laboratories, libraries, and play rooms as a teaching aid wherein people with loud noisy habits are electronically assisted in overcoming these undesirable aspects of their life style.

10 Claims, 2 Drawing Figures

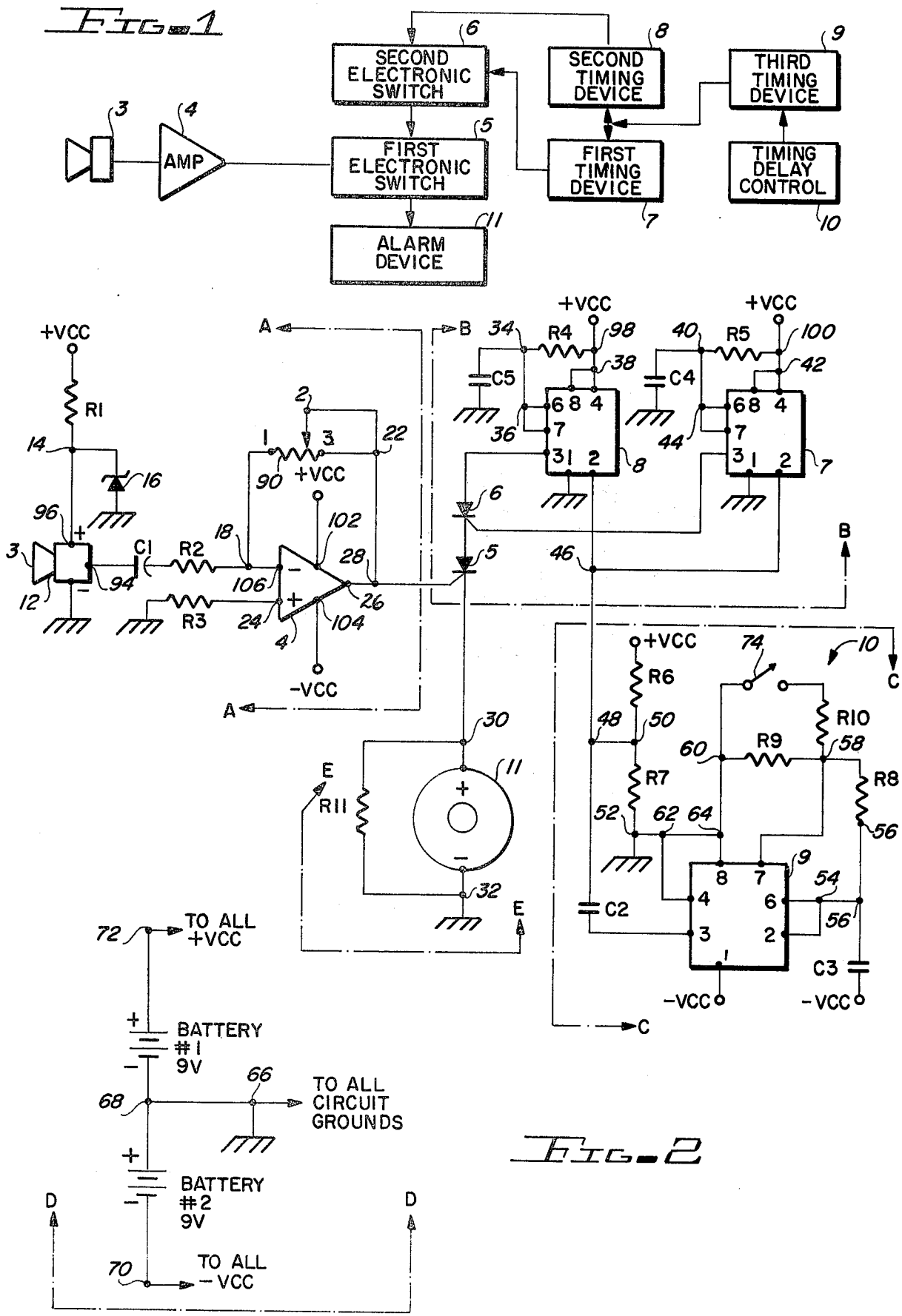

SOUND LEVEL ALARM WHICH IGNORES TRANSIENT SOUNDS

BACKGROUND OF THE INVENTION

In recent years noise pollution has been recognized as being a primary causation of neurosis. Everyone is associated with many environments which are unduly noisy; however, those who are forced to continuously live in noisy environments are not always aware of the excessive background noise. Moreover, many people are forced to share a common environment, and invariably a few of these people habitually make obnoxious or excessive noises which are repugnant to their fellow man. For example, a person may snore in his sleep and never realize that this obnoxious habit is the prime reason for his roommate's neurotic behviaor. Librarians find it tiresome to continually remind noisy people of the necessity for quietness in the study room. Public school class rooms are not always as tranquil as the instructor might desire.

Apparatus which sequentially listens for and detects a predetermined noise level that lasts for a predetermined length of time, and thereafter sounds an alarm in a cyclical manner when the magnitude of the noise reaches a set level of sound and duration is the subject of the present invention. The alarm ceases when the noise level decreases below the preset level.

SUMMARY OF THE INVENTION

This invention sets forth circuitry for monitoring sound levels in an environment. The apparatus cyclically listens to or samples the noise level, and thereafter sounds an alarm when the noise level exceeds a predetermined magnitude during said sampled time. The sensitivity of the circuitry is adjusted so that the alarm is sounded at a selected predetermined magnitude. The "listening time" and the "off time" is also selected to predetermined sequential time intervals. The apparatus ignores all magnitudes of sound during the "off time".

In the preferred form of this invention, the circuitry includes a detector in the form of a microphone for listening to the background noise, an adjustable amplifier for amplifying the noise and connected to an electronic switch, and time delay devices connected to another electronic switch.

The circuitry can be adjusted to listen to the sound level of the room for a half second, for example, and thereafter, the remainder of the cycle time is spent in the stand-by or "off time" configuration. During the first time interval, the alarm circuit is actuated whenever the microphone detects a level of noise that is above the preselected level. This arrangement and selection of the time intervals eliminates the likelihood of the circuitry detecting quick sharp noises such as a book dropped, a cough, or a hand clap.

The time interval selected for the on/off or listening/off time cycle can be 6-7 seconds, for example, so that 5-6 seconds are spent in the stand-by (off time) configuration while 0.5-0.7 seconds is the listening time. During the off time, the alarm will not respond to any kind of noise regardless of the magnitude so long as the duration of the noise is less than 5-6 seconds.

Accordingly, an object of the present invention is the provision of method and apparatus by which a sound level in an environment can be monitored and an alarm sounded when the magnitude of the noise level reaches a predetermined level and lasts for a predetermined length of time.

Another object of the present invention is the provision of circuitry by which the noise level in an enclosure is sequentially monitored for a predetermined length of time, and during another predetermined interval of time, the sound level is not monitored. An alarm is sounded only when the noise level exceeds the preselected total cycle time and loudness.

A still further object of the present invention is the provision of circuitry which listens to the noise generated in an environment, and after a predetermined length of time, an alarm is sounded when the noise level exceeds a predetermined magnitude.

An additional object of the invention is a method of electronically listening to the noise level of an environment for a one time interval and sounding an alarm during a second time interval in response to detecting a noise of a predetermined interval and magnitude.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a block diagram of which broadly sets forth the present invention; and, FIG. 2 is a schematical illustration of circuitry made in accordance with the preferred embodiment of the present invention.

DETAILED DESCRIPTION OF THE PREFERRED EMBODIMENT

In FIG. 1, there is disclosed a block diagram which broadly sets forth circuitry for cyclically monitoring the noise level of an environment. The circuitry emits an alarm when the noise in the environment exceeds a preset level and duration selected by the operator. The circuitry includes a microphone 3 connected to an amplifier 4 which, in turn, is connected to a first electronic switch 5. The amplifier and microphone combination serve to amplify environmental noise to a level adequate to arm (turn on) the first electronic switch. However, this first electronic switch can not supply current to the alarm device 11 until a second electronic switch 6 is armed and has current supplied thereto by first and second timing devices, 7 and 8, respectively. Thus, alarm device 11 is activated only when both of the electronic switches are armed.

The second timing device always supplies a two second interval of current to power the second electronic switch. This sets the length of time that an alarm device can emit a sound to a value of approximately 1.5-2 seconds. The first timing device always supplies a 0.5-0.7 seconds interval of current that sets the length of time that the second electronic switch is armed to conduct its 1.5-2 seconds of current flow.

A third timing device 9 sequences the timing devices 7 and 8 so that they stay together (start their cycles together). Timing device 9 is controlled by a timing delay control 10. There are two preferred modes of operation controlled by the timing delay control:

(1) "Delay OFF"

(2) "Delay ON"

In mode (1), the third timing device sends out a 0.15 seconds pulse of current to activate the first and second timing devices every 2.5 to 2.7 seconds. In mode (2), the third timing device sends out a 0.15 second pulse of current every 6 to 7 seconds. The first and second timing devices can arm the second electronic switch only when the third timing device tells them to do so. Also, note that the first electronic switch can supply current to the alarm device only during the time interval that the second electronic switch is able to supply current to the first electronic switch.

In either mode (1) or (2), the alarm device can only be activated when sufficient environmental noise is present. Without sufficient magnitude of noise, the first electronic switch is never armed; therefore, no matter what the second electronic switch's state may be, the alarm device cannot sound its tone.

When sufficient environmental noise is detected to arm the first electronic switch, the alarm can sound for 1.5 seconds to 2 seconds every 2.5 seconds (mode 1), timed from the start of the alarm tone; or, every 6 to 7 seconds (mode 2), timed from the start of the tone.

It is important to note that the second electronic switch is armed by the 0.5 to 0.7 second current pulse produced by the first timing device. Thus, the circuitry of FIG. 1 responds to environmental noises that occur during this 0.5–0.7 seconds of time that occurs every 2.5 seconds (mode 1) or 6–7 seconds (mode 2). Thus, it is very probable that short, sharp noises will be ignored.

The gain of the amplifier is adjustable by the operator to preselect the magnitude of noise required to arm the first electronic switch. Any time variations above are due to usual component tolerance variations. On the other hand, those skilled in the art, having digested this entire disclosure, will be able to select other time durations while remaining within the confines of this invention.

In the detailed schematical representation of FIG. 2, the following apparatus have been employed in order to provide one suitable form of circuitry:

| RESISTORS All are ¼ W unless indicated. All are ± 5% tolerance. | | |
|---|---|---|
| $R_1$ = 3300 ohms | $R_2$ = 100 ohms | $R_3$ = 100 ohms |
| $R_4$ = 3,900,000 ohms | $R_5$ = 1,500,000 ohms | $R_6$ = 1,000,000 ohms |
| $R_7$ = 1,000,000 ohms | $R_8$ = 220,000 ohms | $R_9$ = 10,000,000 ohms |
| $R_{10}$ = 5,600,000 ohms | $R_{11}$ = 56 ohms at ½ Watt | |

CAPACITORS

All are ±10% tolerance unless noted, $C_1$ = 10 microFarad at 16 V electrolytic (tolerance not critical)
$C_2$ = 0.047 microFarad non-electrolytic (tolerance not critical)
$C_3$ = 1.0 microFarad non-electrolytic
$C_4$ = 0.47 microFarad non-electrolytic
$C_5$ = 0.47 microFarad non-electrolytic With all capacitors above, if the voltage rating is not specified, any value over 15 V will be sufficient.

MISCELLANEOUS

4 = 741 operational amplifier (compensated or non-compensated)
16 = 4.3 V at 400 milliwatt zener diode
90 = 500,000 ohm standard linear potentiometer, ±20% tolerance
6 and 5 = General Electric 106 Y1 SCR or equivalent
7, 8, and 9 = 555 Timer integrated circuits
12 = 2 V to 10 V electret condenser microphone unit, sensetivity of −64 db±3 db, 1000 ohm output impedance
11 = 3 V to 24 V 0.15 milliamp max. 93 db@24 V, piezoelectric buzzer
74 = single pole single throw toggle switch.

OPERATION

In the description of the operation of the circuitry set forth in FIG. 2, two modes of operation can exist. These are the "delay off mode" and the "delay on mode". The sound receptor and amplifier section (Section A—A), as well as the power supply section (Section D—D), function the same in either mode of operation. Operation of Section B—B also remains constant. Thus, these will be described first.

Section A—A

When voltage from the power supply is applied, zener 16 drops about 4 V. The remaining voltage (9 V−4 V=5 V) is dropped on resistor $R_1$. Thus, zener 16 gives a constant voltage of 4 V at junction 14. The zener voltage plus the voltage dropped on $R_1$ will always add up to +Vcc. Since the circuitry of the microphone unit 12 is in parallel with the zener 16, junction 96 will also have 4 V constant. This provides for a constant microphone gain as the Battery #1 voltage changes with use. Of course, microphone 12 uses standard condenser microphone electronics to produce electrical signals at terminal 94 that change with sound and intensity. When environmental noises are picked up by microphone sensor 3 and changed into a variable electrical signal by the microphone circuitry 20, capacitor $C_1$ blocks the DC component of the signal being produced at terminal 94, because capacitor $C_1$ passes only the AC component of the signal to resistor $R_2$. Operational amplifier 4 is wired in the inverting configuration. The purpose of resistor $R_2$ for an operational amplifier so wired is as below:

The gain of the operational amplifier 4 is set by the ratio between $R_2$ and the variable resistor 90. That is amplifier gain = value of resistor 90/value of $R_2$ Experiments showed that a value of 100 ohms for $R_2$ was the correct value when variable resistor 90 was 500,000 ohms maximum. Resistor $R_3$ is found by the accepted formula for operational amplifiers:

$R_3 = (R_2) \times$ (max. value of variable resistor 90)/$R_2$ + max. value of variable resistor 90 which works out to be 100 ohms approximately. $R_3$ helps keep the DC voltage at terminal 26 at 0 V when no input AC signal is being produced by the microphone 12. The purpose of the operational amplifier 4 is to amplify the AC signals that are produced by microphone 12. As the above formula clearly shows, amplifier gain changes as the value of variable resistor 90 changes. Gain equals a maximum when variable resistor 90 is set to a maximum. Gain of the amplifier is zero when the variable resistor 90 is set to zero ohms. Thus, the operator can easily control the sensitivity of the amplifier respective to the environmental sound levels. With variable resistor 90 set to 500,000 ohms, even very small AC signals coming from microphone 12 become large signals at terminal 28. With variable resistor 90 set to zero ohms, there will be no AC signal present at terminal 28 regardless of the magnitude of the signal microphone 12 is producing.

Section D—D

Supply of all power is the purpose of this section. The integrated circuit 555 at timer 9 requires $-9$ V as does the operational amplifier 4. The other circuit components 555 timers 7 and 8, as well as the operational amplifier 4, require $+9$ V. By connecting the negative terminal of Battery #1 to junction 68 and the positive terminal of Battery #2 to junction 68 and calling this connection circuit ground, both "+" and "−" 9 V are produced. Junction 72 is $+9$ V (above ground) and junction 70 is $-9$ V (below ground). Thus, the purpose of these two batteries connected in this manner are to supply current to the remaining circuits of FIG. 2 of the correct voltage and polarity.

Section B—B

Both timers 7 and 8 are wired to operate in the monostable multivibrator mode. Terminal 3 of each 555 timer has a "high" and a "low" state. High="+" voltage present at terminal 3. Conversely low=0 V present at terminal 3. Both timers 7 and 8 will normally remain in the low state. The timers 7 and 8 are forced into this low state by the voltage present at junction 50 in Section C—C. This is in accordance with accepted 555 timer laws. The voltage at junction 50 of Section C—C will always remain at one-half of $+V_{cc}$ unless acted upon by 555 timer 9 of Section C—C. Junctions 50, 48, and 46 serve to pass this voltage to the 555 timers 7 and 8. It is important to note that if the voltage at junction 50 ever drops, this will cause both of the timers 84 and 86 to go into the high state at exactly the same time. This is in accordance with accepted 555 timer theory. In preview of Section C—C, the 555 timer 9 causes this voltage to drop at junction 50. Components connected to the 555 timers 7 and 8, being of different values, force the two separate 555 timers to come out of the high state at different times. The formula for 555 timers that predicts the amount of time spent in the high state is as follows:

Time spent in high state $= (1.1) \times (R) \times (C)$.

For timer 8 which has $R_4 = 3.9M$ ohms and $C_5 = 0.47$ uF,

Time spent in high state $= (1.1)(3.9)(0.47) = 2.02$ seconds or about 2 seconds. For timer 7 which has $R_5 = 1.5M$ ohms and $C_4 = 0.47$ uF, Time spent in high state $= (1.1)(1.5)(0.47) = 0.77$ seconds and with component tolerance variations this can usually be expected to lie between a value of 0.5 to 0.7 seconds.

It is important to again note that after the above times spent in the high state, the 555 timers 7 and 8 will return to the low state automatically. They will stay in the low state until the voltage at junction 50 drops due to the signals coming from 555 timer 9 of Section C—C.

Both 555 timers 7 and 8 are connected to $+V_{cc}$ so that their high state is "+" voltage of about the value of $+V_{cc}$.

Section C—C

Delay on Mode

This section of the circuitry has a 555 timer 9 wired in the astable multivibrator configuration. Note a unique feature of this section has terminals 8 and 4 wired not to $+V_{cc}$, but instead to circuit ground by junctions 64, 62, and 52. Also, note that terminal 1 of 555 timer 9 is not wired to ground, but instead to "$-V_{cc}$". This wiring configuration forces 555 timer 9 to have a high state that is defined by 0 V at terminal 3 and a low state that is defined by approximately "$-V_{cc}$" value of voltage at terminal 3. Thus, 555 timer 9 supplies negative pulses from its terminal 3. The astable wired 555 timer 9 has no normal state in which it stays. It is constantly, cyclically changing from the high to the low state. The amount of time spent in either state is determined by the external components wired to the 555 timer 9. The formula that predicts the amount of time spent in each state are as follows:

Time spent in high state $= (0.7) \times (C_3) \times (R_9 + R_8)$.

Time spent in low state $= (0.7) \times (C_3) \times (R_8)$.

For the values used in the circuitry of FIG. 2, these times calculate to:

Time spent in high state $= (0.7) \times (1\ uF) \times (10M + 0.22M) = 7.2$ seconds.

Component tolerances vary this value between 6 and 7 seconds usually.

Time spent in low state $= (0.7) \times (1\ uF) \times (0.22M) = 0.15$ seconds.

Component tolerances usually keep this value around 0.1 seconds. The SPST switch 74 and R10 serve to alter the above time spent in high state. The above times are calculated with the SPST switch 74 open, thus R10 is not in the circuit.

Delay Off Mode

When the SPST switch 74 is closed, R10 is placed in parallel with the resistor R9. In accordance to accepted electronic circuit laws, their combined value now becomes 3,590,000 ohms.

$$R_{total} = \frac{R_9 \times R_{10}}{R_9 + R_{10}} = \frac{(10\,M) \times (5.6\,M)}{10\,M + 5.6\,M} = 3.59\ Mohms.$$

With this new combined value replacing the previous value for $R_9$, the new time spent in the high state is:

Time spent in high state $= (0.7) \times (1\ uF) \times (3.59M + 0.22M) = 2.67$ seconds.

Thus, switch 74 and resistor $R_{10}$ serve to perform the time delay control that is shown at 10 in FIG. 1.

The series combination of resistors R6 and R7 serve as a voltage divider network, and maintain the voltage at junction 50 at a value that is one-half of the value of +Vcc. As stated above, it is this voltage at junction 50 that keeps the 555 timers 7 and 8 in their low state (Section B—B). Capacitor $C_2$ serves to block this DC voltage from terminal 3 of the 555 timer 9. However, capacitors can pass changes in voltage. Thus, when terminal 3 of 555 timer 9 goes to its low state of "−Vcc", this negative going pulse is passed by $C_2$ directly to junction 48 and, likewise, to junctions 50, 46, and terminal 2 of both 555 timers 7 and 8 of Section B—B. This sudden drop in voltage at these junctions causes both 555 timers 84 and 86 to go into their high state. This is the manner in which the 555 timer 9 sequences 555 timers 7 and 8 so that these timers commence their cycles at the same instant.

The time between 0.15 second output pulses of the 555 timer 9 must never be less than 2.02 seconds, or the time that the 555 timer 8 spends in the high state. Otherwise, the circuit timining sequences can get out of order if this happens. Stated differently, the 555 timer 9 must never send out a negative output pulse until the 555 timer 8 goes back to its low state to allow for component tolerance variations, a timing cycle of 2.67 seconds is selected for the minimum time cycle for the delay off.

Section E—E

Delay On Mode

All of the logic of the other circuit sections comes together in this section of the circuitry. As stated previously, a SCR will not conduct current so long as a positive voltage alone is applied to the anode. In order for a SCR to conduct, a positive voltage must appear on both the anode and on the gate. The SCR will continue to conduct after the gate voltage is removed. The SCR will stop conducting only when the positive voltage is removed from the anode. This resets the SCR and a gate voltage is necessary for conduction, no matter if an anode voltage was present before the gate voltage. Accordingly, there are two possible conditions to describe:

(1) No environmental noise or small amplifier gain.
(2) A large environmental noise value or a small amount of noise and a large amount of amplifier gain.

With the conditions set forth in (1) above, the output of the operational amplifier 4 at terminal 26 will never have enough voltage present to arm the gate of SCR 5. Therefore, since the gate of SCR 5 never receives enough positive voltage to be armed, SCR 5 can never be armed, and SCR 5 can never conduct. Therefore, SCR 5 is off and will remain so until the circuit values are changed. This, of course, means that even with positive voltage appearing at SCR 5's anode, the SCR 5 will never supply current to alarm buzzer 11. Hence, alarm buzzer 11 never sounds a tone, even though the 555 timers 7 and 8 are sequencing "positive" voltages to the anode and gate of SCR 6, due to the action of the 555 timer 9. Therefore, during the described condition (1), SCR 5 can not conduct current to alarm buzzer 11.

Condition (1) will now be described. With the conditions set forth in (2), terminal 26 will now have sufficient AC voltage to arm the gate of SCR 5. Only the positive portion of the AC wave arms the gate of SCR 5. The design of SCR's allows them to ignore the negative voltages that appear on their gates. Astable 555 timer 9 sends forth a negative pulse to junctions 48, 50, 46, and terminal 2 of both 555 timers 7 and 8. This causes the two 555 timers to go to their high state which produces a positive voltage at terminal 3 thereof. The anode and the gate of SCR 6 simultaneously receive positive voltage from the 555 timers 7 and 8. This arms SCR 6, and since SCR 5 is already armed as described above, both SCR 78 and 80 conduct current to the alarm buzzer 11, which of course gives off sound. It is important to note that the alarm buzzer 11 draws a pulsating current, which would cause a premature reset of both SCRs unless a constant current flow is maintained through SCRs 5 and 6. This is accomplished by resistor $R_{11}$ which is placed parallel with respect to alarm buzzer 11.

The constant current drawn by $R_{11}$ prevents premature resetting of the SCRs. The positive voltage supplied to the gate of SCR 6 by 555 timer 7 ceases after about 0.7 second, but SCR 6 continues to conduct current to SCR 5 and alarm buzzer 11 for about 2 seconds, which is the time that 555 timer 8 remains in its high state. When 555 timer 8 goes low, the alarm buzzer 11 ceases to emit sound and SCR 6 resets. Of course, SCR 6 is armed only during the 0.7 second that 555 timer 7 is in its high state. This is a rather small amount of time that passes quickly. In the "delay on mode" that is being described, it will be approximately 6 or 7 seconds before 555 timers 7 and 8 again go into their high state. Since both SCRs 5 and 6 conduct only after they both are armed and since this condition exists only for 0.7 second of time, this 0.7 second is referred to herein as the listening time. Since the listening time occurs only for 0.7 second of time every 6 or 7 seconds, the probability of a sharp, quick noise; such as a cough or hand clap; being ignored is great.

To cause the alarm buzzer 11 to emit sound, the environmental noise must be continuous in order to arm SCR 5 during the listening time, and loud enough to produce adequate AC voltages at terminals 26 and 28 to arm the gate of SCR 5. Noise that occurs outside of the listening time is totally ignored and will not cause the alarm buzzer 11 to emit sound because SCR 6 is not armed by a positive voltage on its gate outside the listening time. Again, in the "delay on mode", 555 timer 9 causes 555 timers 7 and 8 to go to their high states every 6 or 7 seconds, timed from the start of each cycle. In the "delay off mode" all events and sequences occur as previously described in all of this section, with the exception that 555 timer 9 now causes 555 timers 7 and 8 to go into their high states every 2.67 seconds (or 2.5 seconds with component tolerances). Since this is 2.67 seconds measured from the start of the cycles, not the end of the cycles, it is seen that actually only 0.5 second to 0.67 second elapse between the time that the alarm buzzer 11 stops emitting sound and the next listening time occurs. Thus, the listening time occurs much more often in the "delay off mode" than in the "delay on mode". This increases the probability that sharp, quick, short-lived noises will arm SCR 5 during the listening time. Therefore, the probability of the unit responding to said sharp noises that are loud enough to produce adequate AC voltages at terminal 26 is vastly greater. In the "delay off mode", the alarm buzzer 11 will sound at continuous noise and sharp noises that exceed the preset level set by the operator.

In FIG. 2, it will be noted that there are five main sections:

Section A—A, Noise Receptor and Amplifier;
Section B—B, Monostable Multivibrators using two
    555 timers;

Section C—C, Astable Multivibrator using a 555 timer;
Section D—D, Power Supply using two 9 V batteries; and,
Section E—E, Electronic Switches and Alarm Buzzer.

In Section A—A, the microphone 12 is seen to include a sensor device 3 and electronic circuitry 20, such as associated with inexpensive condensor microphones. Zener diode 16 is connected from junction 14 to ground. Resistor $R_1$ is connected from the illustrated power source +Vcc of Section D—D and to junction 14 and to the positive supply connection of the microphone 12 at terminal 96. The negative of the microphone 12 is connected to ground. The positive side of capacitor $C_1$ is connected to the output terminal of the microphone 12 at terminal 94. Capacitor $C_1$'s negative side is connected to resistor $R_2$. Resistor $R_2$ is also connected to the inverting input 106 of the operational amplifier 4 at junction 18 and likewise to the fixed terminal 1 of the variable resistor 90. Resistor $R_3$ is connected to the non-inverting input 24 of the operational amplifier 4 and to the circuit ground. Positive 9 V of the illustrated power supply is supplied to the operational amplifier 4 at terminal 102 and negative 9 V of the illustrated power supply is supplied to the operational amplifier 4 at terminal 104. The movable terminal 2 of the variable resistor 90 is connected to the fixed terminal 3 of the variable resistor 90 at junction 22. Also, the output 26 of the operational amplifier 4 is connected to junction 22 by the junction 28.

In Section B—B, terminal 1 of the 555 timer 8 is connected to circuit ground. Terminal 2 of the 555 timer 8 is connected to junction 46, likewise to terminal 2 of the 555 timer 7, likewise to junction 48, likewise to junction 50 which is the common connection point of resistor $R_6$ and resistor $R_7$, and, finally, likewise to capacitor $C_2$. Terminal 3 of the 555 timer 8 connects to the anode of SCR 6. Terminals 8 and 4 of the 555 timer 8 connect together at the junction 38 and together, both connect to the illustrated power source +Vcc. Resistor $R_4$, likewise, connects to the illustrated power source +Vcc at junction 98. Terminals 6 and 7 of the 555 timer 8 connect together at junction 36 and, together, they connect to junction 34 which ties these terminals (6 snd 7) to resistor $R_4$ and capacitor $C_5$. Capacitor $C_5$ also connects to circuit ground.

Terminal 1 of the 555 timer 7 is connected to the circuit ground. Terminal 2 of the 555 timer is connected to junction 46 which connects to other points detailed in the preceding paragraph. Terminal 3 of the 555 timer 7 is connected to the gate of SCR 6. Both terminals 8 and 4 of the 555 timer 7 connected together at junction 42 and they, in turn, connect to the illustrated power supply +Vcc. Resistor $R_5$ likewise connects to the illustrated power supply +Vcc at junction 100. Terminals 6 and 7 of the 555 timer 7 connect together at junction 44 and together they connect to junction 40 which ties these terminals (6 and 7) to resistor $R_5$ and capacitor $C_4$. Capacitor $C_4$ is also connected to circuit ground.

In Section C—C, resistor $R_6$ connects to the illustrated power supply +Vcc and to junction 50. Resistor $R_7$ connects to junction 50 and to circuit ground. Junction 50, in turn, connects to junctions 48, 46, and to terminal 2 of both 555 timers 7 and 8. Finally, junction 50 also connects to capacitor $C_2$. The −Vcc connection point of the illustrated power supply connects to terminal 1 of the 555 timer 9. One side of capacitor $C_3$ also connects to the −Vcc point of the illustrated power supply. The other side of capacitor $C_3$ also connects to junction 56 which, in turn, connects to junction 54 where terminals 2 and 6 of the 555 timer 9 connect together. Resistor $R_8$ is also connected to junction 56. Resistor $R_8$, in turn, connects to junction 58 which also connects $R_8$ to terminal 7 of the 555 timer 9. Additionally, junction 58 connects to $R_9$ and $R_{10}$. Terminal 3 of the 555 timer 9 connects to capacitor $C_2$. Terminals 8 and 4 of the 555 timer 9 connect together at junctions 62 and 64 and, in turn, these terminals (8 and 4) of the 555 timer 9 connect to circuit ground at junction 52. One terminal of a single pole, single throw switch 74 connects to junction 60 which also connects to resistor $R_9$, junction 64, junction 62, terminals 8 and 4 of 555 timer 9, and finally, all these connect to circuit ground at junction 52. The other terminal of the SPST switch 74 places $R_{10}$ in parallel with $R_9$ when switch 74 is closed. By its being connected to junction 58, switch 74 removes resistor $R_{10}$ from the circuit when switch 74 is opened.

In Section D—D, in order to supply both +9 V and −9 V for circuit operation, the positive of Battery #2 and the negative of Battery #1 are connected together at junction 68 which, in turn, connects to junction 66 which is circuit ground. The positive of Battery #1 supplies +9 V (+Vcc) to all so designated points by its connection to junction 72. The negative of Battery #2 supplies −9 V (−Vcc) to all so designated points by its connection to junction 70.

In Section E—E, there are two series connected SCRs 5 and 6. The anode of SCR 6 connects to terminal 3 of the 555 timer 8. The gate of SCR 6 connects to terminal 3 of the 555 timer 7. The cathode of SCR 6 connects, in series, to the anode of SCR 5. The gate of SCR 5 connects to junctions 28, 22, and 26. This section includes a piezoelectric buzzer 11 whose positive terminal connects to junction 30 and also connects to the cathode of SCR 5. The negative terminal of the piezoelectric buzzer 11 connects to junction 32 and circuit ground. Resistor $R_{11}$ connects to junctions 30 and 32.

I claim:

1. Method of detecting and acknowledging the existence of noise of selected duration and magnitude, comprising the steps of:

(1) generating a signal which is proportional to the magnitude of the noise;

(2) connecting the generated signal to enable a first electronic switch to conduct current to an acknowledging device when said generated signal is in excess of a selected magnitude;

(3) connecting a first timing device to enable a second electronic switch to conduct current to said first electronic switch;

(B 4) connecting a second timing device to enable current to flow to said second electronic switch;

(5) flowing pulses of current from said second timing device to said second electronic switch;

(6) simultaneously actuating said first and second timing devices to enable said second electronic switch to conduct current to said first electronic switch;

(7) setting the length of the pulse of the first timing device to a value which is less than the length of the pulse from the second timing device so that the acknowledging apparatus is energized only when a noise generates a signal during the time interval that the first timing device is energized.

2. The method of claim 1 wherein said first and second electronic switches remain in the conducting configuration once they are both energized until said second timing device interrupts the current flow thereto, whereupon the first and second electronic switches are reset.

3. The method of claim 2 wherein said acknowledging device is connected to provide an audible signal; said electronic switches are SCRs and said timing devices are monostable multivibrators.

4. The method of claim 2 wherein said first and seconnd timing devices are energized simultaneously by a third timing device each 2.5–7 seconds.

5. The method of claim 4 wherein said first timing device provides a pulse of 0.5–0.7 seconds; said second timing device provides a pulse of 2 seconds; and said third timing device can be pulsed either 2.5–2.7 seconds or 6–7 seconds.

6. Apparatus for detecting and acknowledging the existence of noise of selected duration and magnitude comprising:

means generating a signal which is proportional to the magnitude of the noise level in a certain area;

first and second electronic switch means for conducting current flow when energized, acknowledging means for indicating that the noise level has exceeded a selected duration and magnitude;

first and second timing devices, said first timing device being connected to said second electronic switch means for periodically enabling said switch means, said second timing device providing said second switch means with timed pulses of current flow;

said second switch means being connected to said first switch means which in turn is connected to provide current flow to said acknowledging means;

said means generating a signal being connected to enable said first switch means when the magnitude of the generated signal exceeds a set value;

third timing means which simultaneously actuates said first and second timing devices in timed sequence;

so that current flow occurs through said first and second switches to actuate the acknowledging device only when said first and second switches are simultaneously energized.

7. The apparatus of claim 6 wherein said first and second electronic switches remain in the conducting configuration once they are both energized until said second timing device interrupts the current flow thereto, whereupon the first and second electronic switches are reset.

8. The apparatus of claim 7 wherein said acknowledging device is connected to provide an audible signal; said electronic switches are SCRs and said first and second timing devices are monostable multivibrators.

9. The apparatus of claim 7 wherein said first and second timing devices are energized simultaneously by a third timing device each 2.5–7 seconds.

10. The apparatus of claim 9 wherein said first timing device provides a pulse of 0.5–0.7 seconds; said second timing device provides a pulse of 2 seconds; and said third timing device can be pulsed either 2.5–2.7 seconds or 6–7 seconds.

* * * * *

UNITED STATES PATENT AND TRADEMARK OFFICE
CERTIFICATE OF CORRECTION

PATENT NO. : 4,481,504
DATED : November 6, 1984
INVENTOR(S) : WALLACE A. SCOTT, II It is certified that error appears in the above—identified patent and that said Letters Patent is hereby corrected as shown below:

Column 1, line 17, correct the spelling of "behavior";

Column 5, line 46, substitute --7 and 8-- for "84 and 86";

Column 7, line 14, substitute --7 and 8-- for "84 and 86";

Line 21, correct the spelling of "timing";

Line 61, substitute --(2)-- for "(1)";

Column 8, line 6, substitute --SCRs 5 and 6-- for "SCR 78 and 80";

Column 10, line 53, substitute --(4)-- for "(B 4).

Signed and Sealed this

Twenty-eighth Day of May 1985

[SEAL]

Attest:

DONALD J. QUIGG

*Attesting Officer*   *Acting Commissioner of Patents and Trademarks*